(12) United States Patent
Doerr

(10) Patent No.: US 7,620,275 B2
(45) Date of Patent: Nov. 17, 2009

(54) INTEGRATED POLARIZATION SPLITTER/COMBINER

(75) Inventor: Christopher Richard Doerr, Middletown, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 65 days.

(21) Appl. No.: 12/035,636

(22) Filed: Feb. 22, 2008

(65) Prior Publication Data

US 2009/0214150 A1    Aug. 27, 2009

(51) Int. Cl.
*G02B 1/26* (2006.01)
*G02B 1/42* (2006.01)

(52) U.S. Cl. .......................................... 385/22; 385/16
(58) Field of Classification Search .................... 385/16, 385/22
See application file for complete search history.

(56) References Cited

OTHER PUBLICATIONS

Yang, T.R., et al.; "Infrared properties of single crystal MgO, a substrate for high temperature superconducting films"; Applied Optics, vol. 29, No. 3; Jan. 20, 1990; pp. 332-340.
Soldano, L.B., et al.; "Mach-Zehnder Interferometer Polarization Splitter in InGaAsP/InP"; IEEE Photonics Technology Letters, vol. 6, No. 3. Mar. 1994; pp. 402-405.

*Primary Examiner*—Frank G Font
*Assistant Examiner*—Erin D Chiem
(74) *Attorney, Agent, or Firm*—Hitt Gaines, PC

(57) ABSTRACT

Provided is an apparatus and method for use thereof. The apparatus, in one embodiment, includes a 1×2 coupler in communication with a waveguide. The 1×2 coupler, in this embodiment, is configured to separate an input finite bandwidth optical signal provided from the optical waveguide into two similar optical signals. Input ends of first and second waveguide arms, in one embodiment, are in communication with the 1×2 coupler and configured to receive ones of the input optical signals. An inherent birefringence of each of the first and second waveguide arms may be substantially similar. Moreover, the first and second waveguide arms have different physical path lengths that differ by an amount (ΔL). Additionally, a 2×2 coupler may be in optical communication with an output end of the first and second waveguide arms and configured to provide an output TE polarization and an output TM polarization.

20 Claims, 2 Drawing Sheets

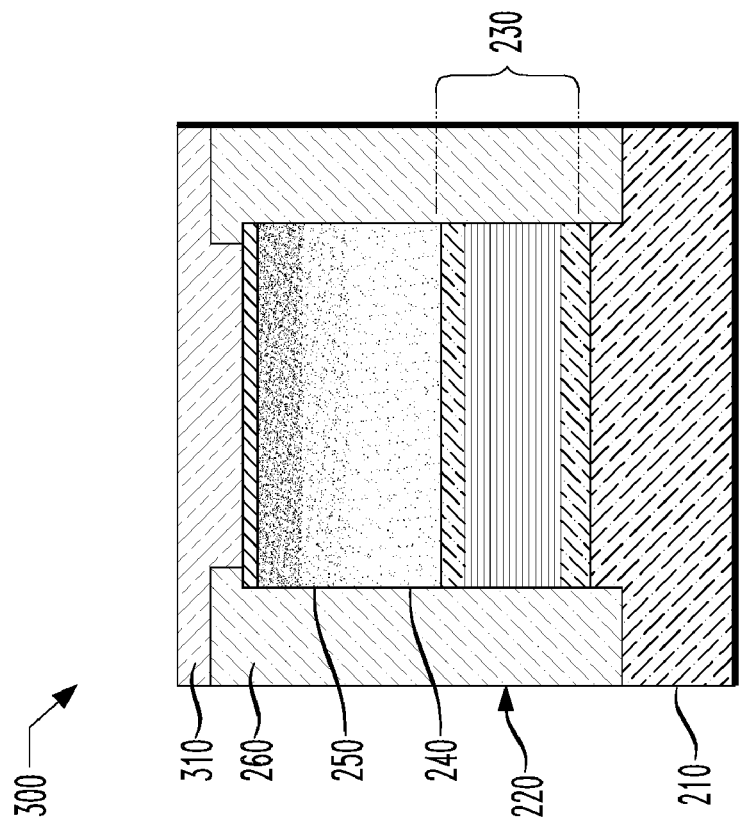
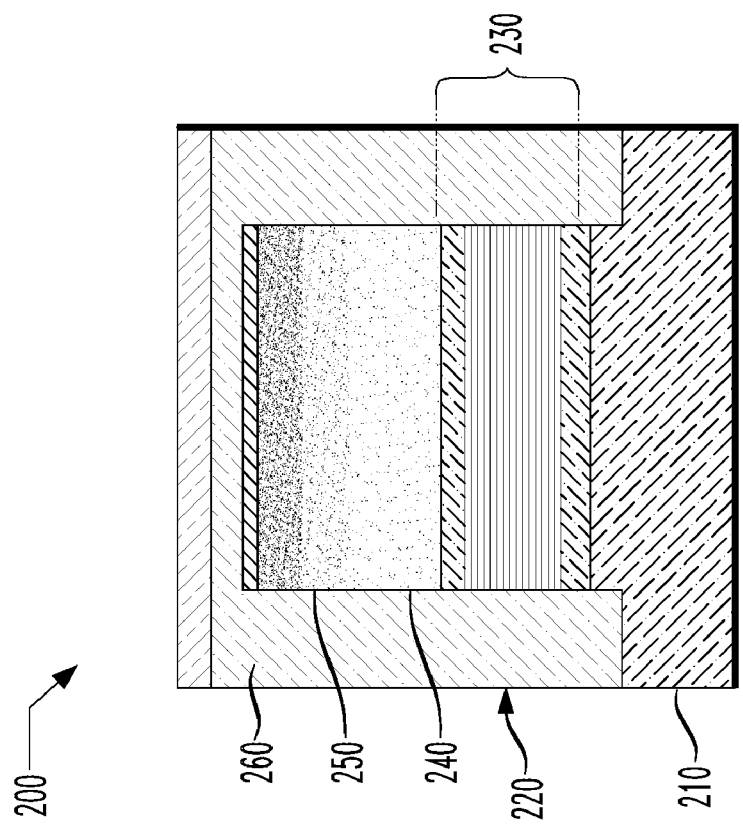

INTEGRATED POLARIZATION SPLITTER/COMBINER

TECHNICAL FIELD

The present invention is directed, in general, to a polarization splitter/combiner.

BACKGROUND

Polarization-division multiplexing (PDM) can be used to significantly increase the transmission capacity in single-mode fibers. In this scheme, a polarization splitter may be used to separate two different polarizations (e.g., transverse electric (TE) and transverse magnetic (TM)) of an optical signal received from an input single-mode fiber. This can be used both at the transmitter and at the receiver. For example, at the transmitter, once split, modulators associated with ones of the two different polarizations may be used to impart data thereon. Thereafter, the two different polarizations having the data imparted thereon may be combined using a polarization combiner, and then placed upon an output single-mode fiber. A polarization combiner is a polarization splitter with the light propagation direction reversed.

PDM, however, is seldom used in today's optical networks. Namely, the cost currently associated with PDM is significant. Moreover, and equally as important, PDM requires being able to track the polarizations at the receivers, which is presently very difficult. Accordingly, what is needed are a device, system and method of use that make PDM more realistic.

SUMMARY

To address the above-discussed deficiencies of the prior art, various embodiments provide an apparatus and method for use of an apparatus. The apparatus, in one embodiment, includes a 1×2 coupler in optical communication with an optical waveguide. The 1×2 coupler, in this embodiment, is configured to separate an input finite bandwidth optical signal provided from the optical waveguide into two similar optical signals. Input ends of first and second waveguide arms, in one embodiment, are in optical communication with the 1×2 coupler and configured to each receive ones of the two optical signals. An inherent birefringence of each of the first and second waveguide arms, is this embodiment, is substantially similar. Moreover, the first and second waveguide arms have different physical path lengths that differ by an amount ($\Delta L$). Additionally, a 2×2 coupler is in optical communication with an output end of the first and second waveguide arms in certain embodiments. The signals from the first and second waveguides interfere in the 2×2 coupler such that the 2×2 coupler outputs an interfered output transverse electric (TE) polarization in one output and an interfered output transverse magnetic (TM) polarization in the other.

Another embodiment is a method of using an apparatus. The method of using the apparatus, in one embodiment, may include: 1) imparting an input finite bandwidth optical signal on an optical waveguide, 2) separating the input finite bandwidth optical signal into two similar optical signals using a 1×2 coupler in optical communication with the optical waveguide, 3) imparting the two similar optical signals upon input ends of first and second waveguide arms in optical communication with the 1×2 coupler, wherein an inherent birefringence of each of the first and second waveguide arms is substantially similar, and further wherein the first and second waveguide arms have different physical path lengths that differ by an amount ($\Delta L$), and 4) coupling an output from each of the output ends of the first and second waveguide arms with a 2×2 coupler, wherein the 2×2 coupler is configured to provide an interfered output TE polarization and an interfered output TM polarization.

BRIEF DESCRIPTION OF THE DRAWINGS

For a more complete understanding of the disclosure, reference is now made to the following descriptions:

FIGS. 2 and 3 illustrate various cross-sections of the apparatus of FIG. 1.

DETAILED DESCRIPTION

Figure 1:
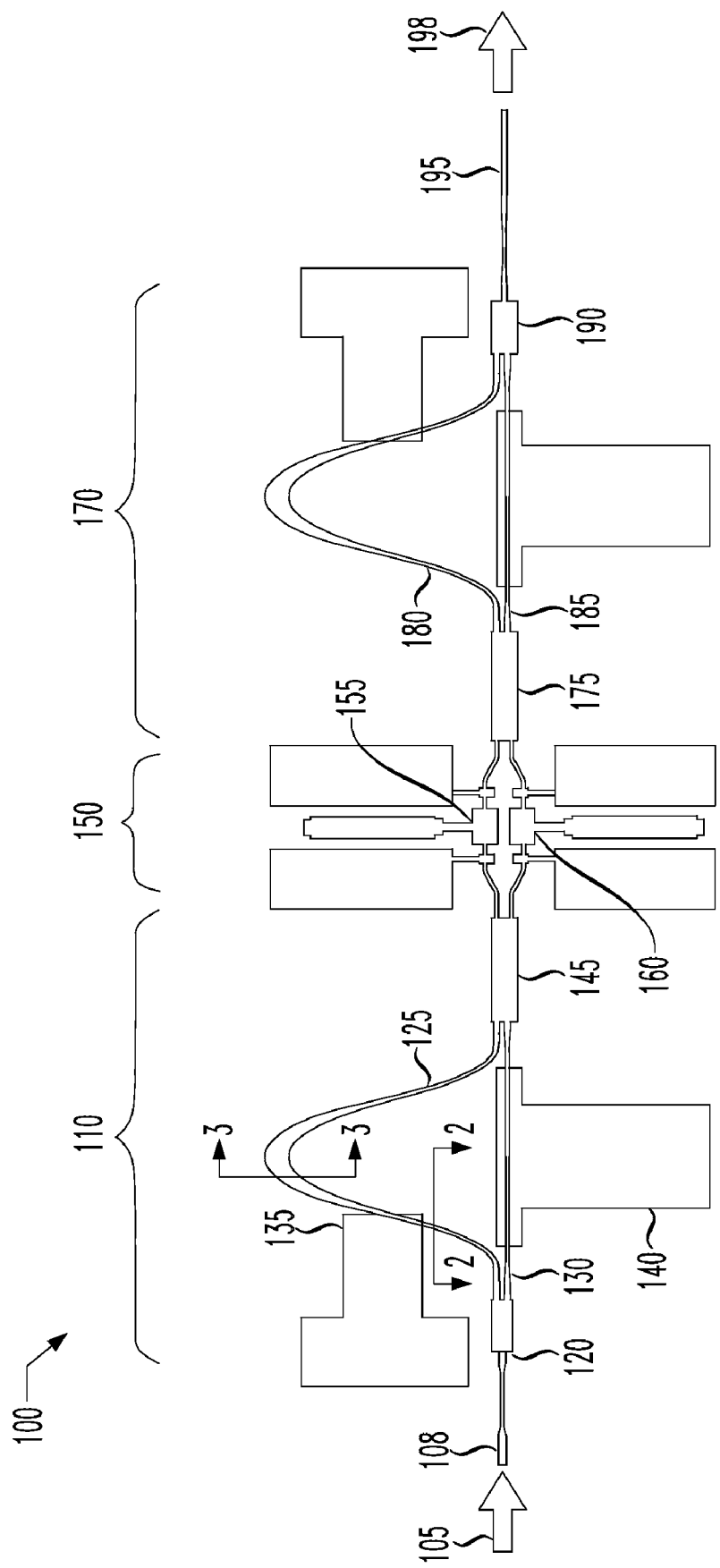
FIG. 1 illustrates an apparatus manufactured in accordance with the disclosure.

The present disclosure is based, at least in part, on the acknowledgement that with the advent of lower-cost electronics and optics, polarization-division multiplexing (PDM) is becoming an attractive option. With this acknowledgement in mind, the present disclosure recognizes that in semiconductor photonic integrated circuits (PICs), the waveguide birefringence is often very high. This is mainly a result of the waveguide cross-section having a large aspect ratio (e.g., being much smaller in height than width). The small height is often necessary in high speed devices, such as high-speed photodetectors and high-speed modulators, in order to either minimize electron and hole transport time or maximize the electric field. Because of the large aspect ratio, the polarization-dependent wavelength shift (PDWS) can be high, for example on the order of about 5 nm in one example. PDWS=$\lambda \Delta n/n$, where $\lambda$ is the wavelength, $\Delta n$ is the difference between the refractive indices for transverse electric (TE) and transverse magnetic (TM) polarization light, and n is the average refractive index.

By TE polarized light, the disclosure means light that has its electric field oscillating predominantly parallel to a reference plane, and by TM polarized light, the disclosure means light that has its magnetic field oscillating predominantly parallel to the same reference plane. The disclosure realizes that in integrated optics there are often no pure TE and TM waves, and instead they are referred to as quasi-TE and quasi-TM waves. Thus in this document, any reference to TE and TM waves (e.g., in the context of integrated optics) can be interpreted as quasi-TE and quasi-TM waves.

The present disclosure recognizes that because the PDWS can be so large, a compact polarization splitter (or equivalently a polarization combiner) can be constructed as an interferometer comprised of a 1×2 coupler, first and second waveguide arms and a 2×2 coupler. In this scenario, the first and second waveguide arms have substantially similar birefringence values, and moreover, have different physical path lengths that differ by an amount ($\Delta L$). In one embodiment, the present disclosure recognizes that the amount ($\Delta L$) may be calculated using the following equation:

$$\Delta L = \frac{\lambda_0^2}{2(PDWS)n_g},$$

wherein $\lambda_0$ is the wavelength of the input finite bandwidth optical signal, PDWS is the polarization-dependent wavelength shift between the TE polarization and TM polarization, and $n_g$ is a group index. The group index $n_g$, can be defined by the equation $n_g$=n–$\lambda$dn/d$\lambda$.

FIG. 1 illustrates an apparatus 100 manufactured in accordance with the disclosure. The apparatus 100 of FIG. 1 includes an input optical waveguide 108, an integrated polarization splitter region 110, a modulation region 150, an integrated polarization combiner region 170, and an output optical waveguide 195. The integrated polarization splitter region 110, modulation region 160, and integrated polarization combiner region 170, in the embodiment of FIG. 1, form at least a portion of a dual-polarization on-off-keying modulator, which may in turn form at least a portion of a PIC.

The input optical waveguide 108 and output optical waveguide 195 may comprise many different structures. In one embodiment, the input optical waveguide 108 and output optical waveguide 195 comprise a waveguide integrated onto a semiconductor substrate. For example, the input optical waveguide 108 and output optical waveguide 195 might comprise a benzocyclobutene (BCB)-clad ridge waveguides with a collection of quantum wells in a p-i-n structure, all of which is formed over a doped indium phosphide semiconductor substrate. However, other embodiments exist wherein the input optical waveguide 108 and output optical waveguide 195 comprise different features and materials. As one might expect, the input optical waveguide 108 and output optical waveguide 195, in one embodiment, are configured to couple to associated optical fibers (e.g., single-mode fibers).

Coupled to the input optical waveguide 108 is the integrated polarization splitter region 110. The polarization splitter region 110 is integrated, in this embodiment, because its features are integrated on a single substrate. In certain embodiments, the integrated polarization splitter region 110 forms a portion of a PIC. The region 110, in the embodiment shown, initially includes a 1×2 coupler 120 in optical communication with the input optical waveguide 108. The 1×2 coupler 120 is configured to separate an input finite bandwidth optical signal 105 provided from the input optical waveguide 108 into two similar optical signals. The term finite bandwidth, as used throughout this disclosure, means an optical signal having a narrow bandwidth (e.g., a bandwidth of about 2 nm or less). Accordingly, optical signals having bandwidths greater than about 2 nm would not be considered finite, as defined herein, and thus are generally not applicable. The input finite bandwidth optical signal 105, in one embodiment, has equal power in the TE polarization and the TM polarization (e.g., 45° polarized).

The 1×2 coupler 120 may comprise many different configurations and remain within the purview of the disclosure. In one example embodiment, the 1×2 coupler 120 comprises a multimode interference (MMI) coupler. In yet other embodiments, the 1×2 coupler 120 comprises a directional coupler, star coupler, or y-branch coupler. In even other embodiments, the 1×2 coupler 120 is actually a 2×2 coupler with one of the inputs unused. Accordingly, any N×N coupler could be used as a 1×2 coupler as long as it is configured to receive a single input signal and separate that single input signal into two similar signals, such as is the case when a 2×2 coupler has one input unused.

Optically coupled to the 1×2 coupler 120 are first and second waveguide arms 125, 130. In accordance with the disclosure, the first and second waveguide arms 125, 130 have substantially similar birefringence values. The phrase substantially similar birefringence values, as used throughout this disclosure, means that but for slight unintentional material variations, thickness variations, dopant variations, etc., the birefringence values of the first and second waveguide arms 125, 130 would be the same. The phrase substantially similar birefringence values excludes any differences in birefringence that are intentionally created. For example, in most embodiments the first and second waveguide arms 125, 130 comprise identical materials, having identical thicknesses, identical dopant concentrations, etc., and thus the birefringence values would presumably be identical. Nevertheless, those situations may occur when the birefringence values of the first and second waveguide arms 125, 130 differ by a slight amount even though it was the intention that they be identical. The phrase substantially similar birefringence value is intended to capture these situations.

Additionally in accordance with the disclosure, the first and second waveguide arms 125, 130 have different physical path lengths, for example differing by an amount ($\Delta L_1$). The different physical path lengths, in this embodiment, are included to account for the PDWS of the first and second waveguide arms 125, 130. The difference in path length ($\Delta L_1$) is not slight, but is significant to account for the PDWS. For example, the difference in path length ($\Delta L_1$), in one embodiment, is at least about 1 μm or more. In an alternative embodiment, the difference in path length ($\Delta L_1$) is at least about 2 μm or more, and in yet another embodiment about 20 μm or more. Accordingly, only minimal differences in path length ($\Delta L_1$) are insufficient to account for the PDWS, particularly given the fact that the first and second waveguide arms 125, 130 typically have large birefringence values. The difference in path length ($\Delta L_1$), for any given input finite bandwidth optical signal and any given material may be calculated as discussed above.

Turning briefly to FIG. 2, illustrated is a cross-section 200 of the first waveguide arm 125, as marked by 2 in FIG. 1. The cross-section illustrated in FIG. 2 indicates the various different layers and materials that the first and second waveguide arms 125, 130 may in one embodiment comprise. For example, as illustrated in FIG. 2, the first and second waveguide arms 125, 130 may comprise a ridge waveguide 220 formed over a substrate 210. The substrate 210 in the embodiment of FIG. 2 is an n-type doped indium phosphide substrate. Nevertheless, other substrates could be used.

The ridge waveguide 220 of FIG. 2 comprises a BCB-clad ridge waveguide including a collection of quantum wells and barrier layers 230. For example, in the embodiment of FIG. 2 the collection of quantum wells and barrier layers 230 includes eight quantum wells and nine barrier layers. The ridge waveguide 220 further includes an intrinsic indium phosphide layer 240 located over the collection of quantum wells and barrier layers 230. Moreover, the ridge waveguide 220 includes a p-type doped indium phosphide layer 250 located over the intrinsic indium phosphide layer 240. The n-type doped indium phosphide substrate 210, intrinsic indium phosphide layer 240, and p-type doped indium phosphide layer 250, construct a p-i-n structure. Surrounding the ridge waveguide 220 is cladding 260, in this embodiment the BCB.

Associated with ones of the first and second waveguide arms 125, 130 in the embodiment of FIG. 1 are first and second phase-shifters 135, 140. The first and second phase shifters 135, 140, in this embodiment, are configured to tune the first and second waveguide arms 125, 130 to accommodate different input finite bandwidth optical signals 105. For example, in an embodiment wherein the first and second waveguide arms 125, 130, and more specifically the difference in path length ($\Delta L_1$) of those arms, is set for a specific input finite bandwidth optical signal, the first and second phase-shifters 135, 140 might be used to employ that same system with other different input finite bandwidth optical signals 105. As an example, if the system were specifically designed for a laser wavelength of 1543.5 nm, it might have a difference in path length ($\Delta L_1$) between the first and second waveguide arms 125, 130 of about 66 μm. If a user were needing to employ a different laser wavelength for that specifically designed system, the first and second phase-shifters 135, 140 could be used to adjust the stop band of the existing first and second waveguide arms 125, 130, to any wavelength to match the newly desired input finite bandwidth optical signal. The first and second phase-shifters 135, 140, among others, may comprise current-injection phase shifters. Another choice could be a thermo-optic phase shifter. A thermo-optic phase shifter typically consists of a controllable heater over the waveguide. While the disclosed embodiment uses two phase shifters, other embodiments exist wherein a single phase shifter is employed to tune the wavelength.

Turning briefly to FIG. 3, illustrated is a cross-section 300 of the first waveguide arm 125 taken through the first phase-shifter 135, as marked by 3 on FIG. 1. The cross-section 300 of FIG. 3 is substantially similar to the cross-section 200 of FIG. 2 with the exception of the phase-shifter contact 310. Accordingly, like reference numbers indicate like features. The phase-shifter contact 310, as one would expect, may comprise a variety of different conductive materials, including gold, silver, platinum, titanium, etc. The cross-section 300 of FIG. 3 is very similar to what a cross-sectional view taking through a waveguide in the modulator region 150 might look.

Waveguides, such as those shown in FIGS. 2 and 3, may be manufactured using a variety of different processes. Nevertheless, in one embodiment, such waveguides are manufactured by first growing the entire layer structure on an n-type doped indium phosphide wafer. Thereafter, holes may be etched in the layer structure where bond pads will be located. Such bond pads may be used in those regions of the apparatus 100 needing modulation, for example the modulation region 150. Thereafter, the ridge waveguides may be patterned and etched. BCB cladding may then be spun on and cured. Thereafter, holes may be opened in the BCB cladding where the phase-shifters are needed, as well as where the modulators may be needed, and contact metal deposited therein. While one method for forming the waveguides has been given in this paragraph, those skilled in the art understand that other methodologies could be used to form the appropriate waveguides.

Optically coupled to opposing ends of the first and second waveguide arms 125, 130 is a 2×2 coupler 145. The 2×2 coupler 145, in this embodiment, is configured to provide an interfered output TE polarization and an interfered output TM polarization. For example, the 2×2 coupler 145, in this embodiment, is configured to interfere the two optical beams coming from the first and second waveguide arms 125, 130 (e.g., two interferometer arms). This interference is what provides constructive interference for one polarization in one port and constructive interference for the other polarization in the other port. Accordingly, what results are the interfered output TE polarization and the interfered output TM polarization.

The 2×2 coupler 145, similar to the 1×2 coupler 120 may comprise many different configurations and remain within the purview of the disclosure. In one example embodiment, the 2×2 coupler 145 comprises a multimode interference (MMI) coupler. In yet other embodiments, the 2×2 coupler 145 comprises a directional coupler, star coupler, or a cascade of couplers. In even other embodiments, the 2×2 coupler 145 comprises a different configuration while retaining its ability to provide the interfered output TE polarization and an interfered output TM polarization.

Optically coupled to the integrated polarization splitter region 110 is the modulation region 150. The modulation region 150, in the embodiment shown, includes a first modulator 155 associated with the interfered output TE polarization and a second modulator 160 associated with the interfered output TM polarization. The first and second modulators 155, 160, in this embodiment, are configured to provide a modulated TE polarization and a modulated TM polarization. For example, the first and second modulators 155, 160 may be used to impart data upon the different polarizations separated using the polarization splitter region 110.

The first and second modulators 155, 160, may comprise various different structures. For example, in the embodiment of FIG. 1, the first and second modulators 155, 160 comprise electro-absorption modulators. In other embodiments, however, the first and second modulators 155, 160 comprise different modulators.

Optically coupled to the modulator region 150 is an integrated polarization combiner region 170. The integrated polarization combiner region 170, in the embodiment shown, is substantially similar to the integrated polarization splitter region 110, but with the elements in reverse order. Accordingly, the integrated polarization combiner region 170 of FIG. 1 includes a 2×2 combiner 175, third and fourth waveguide arms 180, 185, and then a 1×2 combiner 190. In sum, the integrated polarization combiner region 170 takes the modulated TE polarization and modulated TM polarization from the modulator region 150, and through the reverse process as used in the integrated polarization splitter region 110, combines those polarizations into an output finite bandwidth optical signal 198 imparted upon the output optical waveguide 195.

An apparatus, such as the apparatus 100 of FIG. 1, may be used (e.g., operated) in various different ways. In one embodiment, however, the apparatus 100 is used by first providing an input finite bandwidth optical signal 105 on the input optical waveguide 108. The input finite bandwidth optical signal 105 then optically couples to the 1×2 coupler 120. The 1×2 coupler 120, in this embodiment, separates the input finite bandwidth optical signal 105 into two similar optical signals. The two similar optical signals then optically couple to ones of the first and second waveguide arms 125, 130. As indicated above, the difference in path length (ΔL) of the first and second waveguide arms 125, 130, is such that the accumulated phase difference between the two lightwaves in the two waveguides is 180 degrees different for the TE polarization than for the TM polarization.

In those embodiments wherein the actual input finite bandwidth optical signal 105 does not match the difference in physical path length (ΔL) of the first and second waveguide arms 125, 130, the first and second phase-shifters 135, 140, may be used to effectively tune the phase of the first and/or second waveguide arms 125, 130 to this different input finite bandwidth optical signal 105. Thereafter, the output from each of the output ends of the first and second waveguide arms 125, 130 optically couple to the 2×2 coupler 145. At the 2×2 coupler, at a specific wavelength, TE polarization interferes constructively in the first output port of the 2×2 coupler and destructively in the second port. Likewise, TM polarization interferes destructively in the first port and constructively in the second port. The 2×2 coupler 145, in this embodiment, then provides an interfered output TE polarization and an interfered output TM polarization.

In following with FIG. 1, the interfered output TE polarization and an interfered output TM polarization optically couple to ones of the first and second modulators 155, 160 of the modulator region 150. As indicated above, the first and second modulators 155, 160 impart a signal on the interfered output TE polarization and an interfered output TM, thereby providing a modulated TE polarization and a modulated TM polarization. The modulated TE polarization and modulated TM polarization then traverse the integrated polarization combiner region 170 resulting in an output finite bandwidth optical signal 198 on the output optical waveguide 195. Those skilled in the art understand that the integrated polarization combiner region 170 is effectively reversing what the integrated polarization splitter region 110 previously accomplished. Accordingly, each of the inputs and outputs of the different regions may be swapped.

An apparatus and method of use as discussed above has many benefits over previous devices and methods. For instance, the design of the disclosed apparatus is advantageous to other designs because it requires little (e.g., none in one embodiment) extra or critical processing steps to implement. Additionally, it employs well known contact lithography. Moreover, the apparatus is compact and robust. The robust nature of the apparatus is achieved, in part, as a result of the precisely controlled growth process of the layer structure. In summation, the apparatus is capable of providing a highly compact dual-polarization on-off-keying modulator, for example in indium phosphide, with demonstrated performance of at least about 80 Gb/s.

Although the present disclosure has been described in detail, those skilled in the pertinent art should understand that they can make various changes, substitutions and alterations herein without departing from the spirit and scope of the disclosure.

What is claimed is:

1. An apparatus, comprising:
   a 1×2 coupler in optical communication with an input optical waveguide, the 1×2 coupler configured to separate an input finite bandwidth optical signal provided from the input optical waveguide into two similar optical signals;
   input ends of first and second waveguide arms in optical communication with the 1×2 coupler and configured to each receive ones of the two similar optical signals, wherein an inherent birefringence of each of the first and second waveguide arms is substantially similar, and further wherein the first and second waveguide arms have different physical path lengths that differ by an amount ($\Delta L$); and
   a 2×2 coupler in optical communication with an output end of the first and second waveguide arms, wherein the 2×2 coupler is configured to provide an interfered output transverse electric (TE) polarization and an interfered output transverse magnetic (TM) polarization.

2. The apparatus of claim 1 wherein the amount ($\Delta L$) is about 2 μm or more.

3. The apparatus of claim 1 wherein the amount ($\Delta L$) is configured using the equation $$\Delta L = \frac{\lambda_0^2}{2(PDWS)n_g},$$

wherein $\lambda_0$ is the wavelength of the input finite bandwidth optical signal, PDWS is the polarization-dependent wavelength shift between the TE polarization and TM polarization, and $n_g$ is a group index.

4. The apparatus of claim 1 wherein the 1×2 coupler and the 2×2 coupler are multimode interference couplers.

5. The apparatus of claim 1 further including at least one phase shifter associated with the first waveguide arm or the second waveguide arm, the phase shifter configured to tune the interferometer phase to accommodate input finite bandwidth optical signals at different wavelengths.

6. The apparatus of claim 5 wherein at least one of the phase shifters is a current-injection phase shifter.

7. The apparatus of claim 5 wherein at least one of the phase shifters is a thermo-optic phase shifter.

8. The apparatus of claim 1 wherein the 1×2 coupler is a 2×2 coupler with one input not excited.

9. The apparatus of claim 1 wherein all inputs and outputs are swappable.

10. The apparatus of claim 1 further including a first modulator associated with the interfered output TE polarization and a second modulator associated with the interfered output TM polarization, the first and second modulators configured to provide a modulated TE polarization and a modulated TM polarization.

11. The apparatus of claim 10, wherein the 1×2 coupler, first and second waveguide arms, and the 2×2 coupler form part of an integrated polarization splitter, and further including an integrated polarization combiner in optical communication with the modulated TE polarization and the modulated TM polarization and configured to combine the modulate TE polarization and the modulated TM polarization into an output finite bandwidth optical signal, wherein the integrated polarization combiner includes a second 2×2 coupler, a second 1×2 coupler, and third and fourth waveguide arms positioned between the second 2×2 coupler and the second 1×2 coupler, the third and fourth waveguide arms having substantially similar inherent birefringence and having different physical path lengths that differ by an amount ($\Delta L_2$).

12. The apparatus of claim 11 wherein the integrated polarization splitter, first and second modulators and the integrated polarization combiner form at least a portion of a dual-polarization on-of-keying modulator.

13. The apparatus of claim 1 wherein the first and second waveguide arms comprise similarly configured indium phosphide waveguides.

14. A method for use, comprising:
   imparting an input finite bandwidth optical signal on an optical waveguide;
   separating the input finite bandwidth optical signal into two similar optical signals using a 1×2 coupler in optical communication with the optical waveguide;
   imparting the two similar optical signals upon ones of input ends of first and second waveguide arms in optical communication with the 1×2 coupler, wherein an inherent birefringence of each of the first and second waveguide arms is substantially similar, and further wherein the first and second waveguide arms have different physical path lengths that differ by an amount ($\Delta L$); and
   coupling an output from each of the output ends of the first and second waveguide arms with a 2×2 coupler, wherein the 2×2 coupler is configured to provide an interfered output transverse electric (TE) polarization and an interfered output transverse magnetic (TM) polarization.

15. The method of claim 14 wherein the input bandwidth optical signal has equal power in the TE polarization and the TM polarization.

16. The method of claim 14 further including employing at least one phase shifter associated with the first waveguide arm or the second waveguide arm to tune the interferometer phase to accommodate input finite bandwidth optical signals at different wavelengths.

17. The method of claim 16 wherein employing at least one phase shifter includes employing at least one current-injection phase shifter.

18. The method of claim 14 further including modulating the interfered output TE polarization into a modulated TE polarization with a first modulator and modulating the interfered output TM polarization into a modulated TM polarization with a second modulator.

19. The method of claim 18 wherein the first modulator and the second modulator are electro-absorption modulators.

20. The method of claim 18 wherein the 1×2 coupler, first and second waveguide arms, and the 2×2 coupler form part of an integrated polarization splitter, and further including combining the modulated TE polarization and modulated TM polarization into an output finite bandwidth optical signal using an integrated polarization combiner, wherein the integrated polarization combiner includes a second 2×2 coupler, a second 1×2 coupler, and third and fourth waveguide arms positioned between the second 2×2 coupler and the second 1×2 coupler, the third and fourth waveguide arms having substantially similar inherent birefringence and having different physical path lengths that differ by an amount ($\Delta L_2$).

* * * * *